United States Patent [19]

Larkin

[11] Patent Number: 4,567,878

[45] Date of Patent: Feb. 4, 1986

[54] SOLAR ANTI-REVERSE SIPHON SYSTEM

[76] Inventor: William J. Larkin, 432 Begonia, Corona del Mar, Calif. 92625

[21] Appl. No.: 737,864

[22] Filed: May 28, 1985

Related U.S. Application Data

[63] Continuation-in-part of Ser. No. 595,485, Mar. 30, 1984, Pat. No. 4,519,383.

[51] Int. Cl.$^4$ .............................................. F24J 3/02
[52] U.S. Cl. ..................................... 126/434; 126/437
[58] Field of Search ........ 126/433, 434, 435, 418–420, 126/437, 448; 165/60, 106

[56] References Cited

U.S. PATENT DOCUMENTS

| | | | |
|---|---|---|---|
| 4,003,367 | 1/1977 | Wikholm | 126/434 |
| 4,010,734 | 3/1977 | Chayet | 126/437 |
| 4,245,617 | 1/1981 | Buckley | 126/434 |
| 4,428,362 | 1/1984 | Larkin | 126/434 |
| 4,519,383 | 5/1985 | Larkin | 126/434 |

FOREIGN PATENT DOCUMENTS

| | | | |
|---|---|---|---|
| 33562 | 3/1980 | Japan | 126/434 |
| 144356 | 11/1981 | Japan | 126/434 |

Primary Examiner—James C. Yeung
Attorney, Agent, or Firm—Ralph S. Branscomb

[57] ABSTRACT

A solar heater system utilizes a passive anti-reverse siphon system to prevent the reversal of the fluid flow during evenings and other times when the ambient temperature is below the temperature within the system. The anti-reverse siphon system used functions strictly as a result of the geometry of the system and does not utilize either physical check valves or the immiscible fluid meniscus check valve system. Several embodiments include a wedge-shaped roof type version using a tandem or duplex system which heats first water for hot water use, with the hot water subsequently acting as the heating elment in the second of the tandem series for space heating, and other embodiments utilize a heat exchanger, a horizontally extended tank, a specialized corrugated hot plate for a flat plate solar collector which acts as the heating element for the system, and a system utilizing a special immersion heater in the anti-reverse siphon loop which can be externally energized if reverse siphon forces are so strong that the geometry of the system is inadequate to overcome them or if increased freeze protection is desired for the system.

10 Claims, 6 Drawing Figures

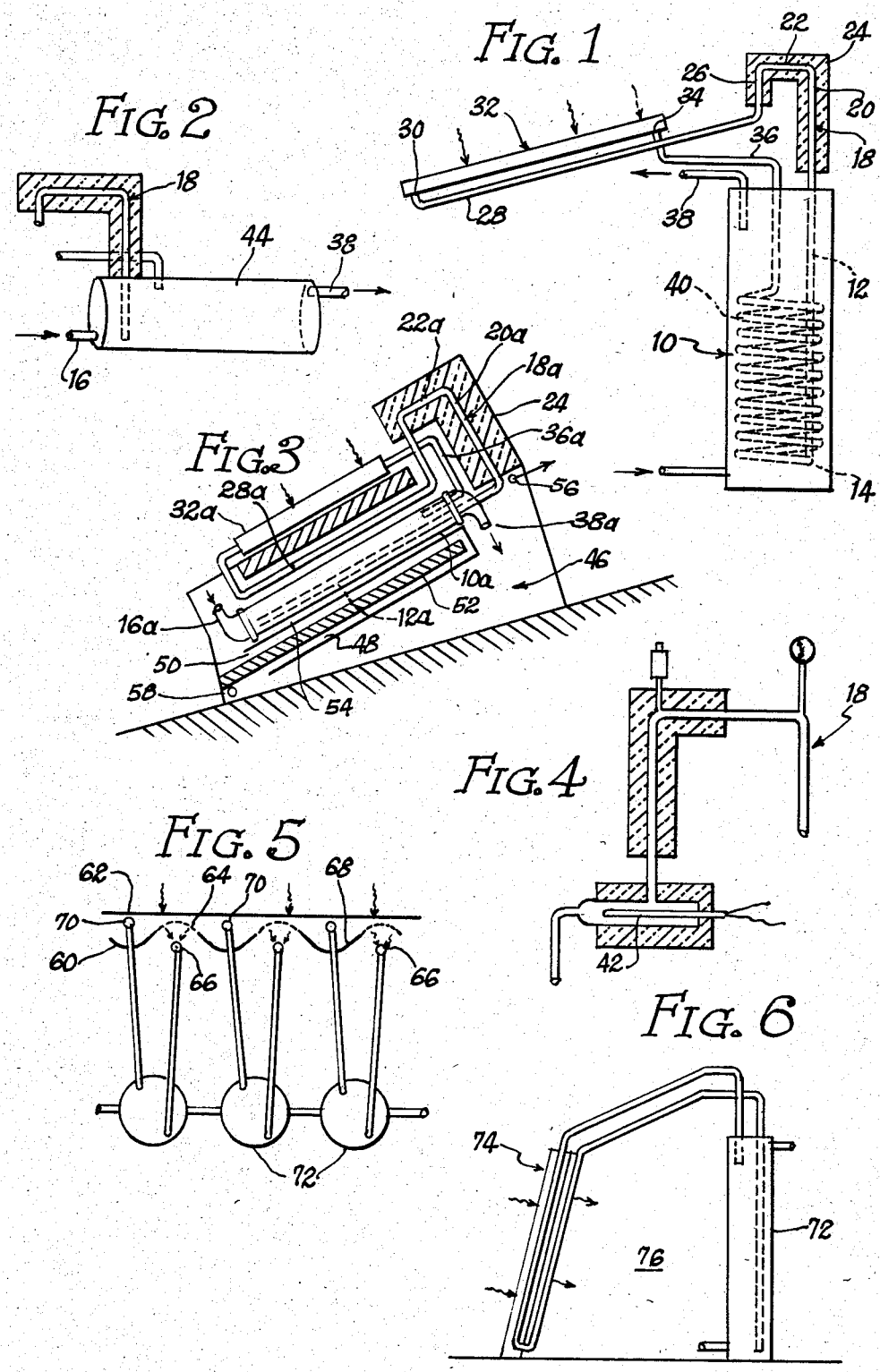

4,567,878

SOLAR ANTI-REVERSE SIPHON SYSTEM

BACKGROUND OF THE INVENTION

This application is a continuation in part application of application Ser. No. 06/595,485, filed 03/30/84, to be issued on May 28, 1985, U.S. Pat. No. 4,519,383. That patent in turn related to prior U.S. Pat. No. 4,428,362, issued Jan. 31, 1984. Both of these prior patents pertain to passive anti-reverse siphon systems.

More specifically, the two prior patents have orbited around the central concept of overcoming the reverse siphon problem inherent in passive solar heaters. This problem results from fact that a passive solar heater, i.e. one utilizing no external driving forces or pumps to circulate water or other operating fluid other than the heat differential itself, generally requires that the heated fluid (ordinarily water) storage tank be arranged at an elevated position relative to the flat plate collector so that the hot water from the flat plate will naturally flow upwards into the storage tank. Thus at night, when the collector becomes colder than the storage tank due to radiation and the lowered ambient temperature, the system is stable because the cold water and the flat plate is below the warmer water in the storage tank.

However, the utilization of a system wherein the storage tank must be elevated above the heating element itself is inherently more awkward, and ordinarily more expensive and hard to install, and requires more surface area to install, than an ideal system which would incorporate both the hot water tank and flat plate collector in a single unit. However, as suggested above, the most efficient system from the point of view of economics and manufacture and compactness suffers from the fatal weakness of reverse siphoning when ambient temperature drops below that necessary to maintain the flat plate temperature higher than the temperature in the storage tank. As the flat plate cools, the water (or other fluid) becomes denser than the other water in the heater, and will float downwardly, forcing cold water up into the hot water in the storage tank and in turn drawing the heated water into the top of the flat plate collector, to be passed through it, cooled and introduced into the bottom of the hot water storage tank. This assumes the most basic, simple system wherein the top of the flat plate collector connects, and delivers heated water to, the top of the hot water tank, and the flat plate collector is replenished by water drawn from the bottom of the storage tank into the bottom of the flat plate.

As discussed in some detail in the prior patents, attempts have been made to in essence create a one-way valve within the system to eliminate the reverse siphoning and thus possibilitate utilization of the more compact, economical systems. Naturally, the problem could be easily eliminated by utilization of an outside energy source and mechanical valves and/or pumps, but the added complexity with its potential for maintenance problems and breakdown is inferior to the maintenance-free, durable and reasonably economic operation that is characteristic of a good flat plate system.

The efforts to create a check valve in essence cover experimentation with membrane-thin check valve flaps, but even the thinnest membrane offered too much resistance to forward cycling of the system. Thereafter, several patents have been issued on a clever system utilizing an upright, open-topped pipe within the circulatory system with a meniscus line between a lighter, immiscible oil floating on a lower, immiscible substance like water, falling right about the level of the open top of the stub pipe. Thus, when water is flowing upward through and out the top of the stub pipe, it passes below the floating immiscible oil, but when flow is attempted in the reverse direction, the oil, which lies right at or very slightly below the top of the stub pipe, is drawn into the stub pipe creating a negative pressure head which linearly increases as more oil is drawn down into the stub pipe, eventually offsetting and stopping the otherwise reverse pressure head which causes the backward flowing of the system.

In essence the geometry utilized to create a physical, geometrical system which by itself would eliminate the reverse flow in the nocturnal hours incorporated what is referred to as a Anti-Reverse Siphon, or ARS, loop. Throughout this discussion and specification, water will be discussed as the operating fluid within the system, although almost any fluid will work. The ARS loop extends upwardly from the top of the hot water storage tank, then loops downwardly and connects to the descending passageway which delivers fresh water to the bottom of the flat plate collector. A pipe within the hot water storage tank connects the ARS loop from the top of the storage tank down to near the bottom of the hot water storage tank where water is drawn to be delivered through the ARS loop and subsequently to the bottom of the flat plate.

Outside the tank, the rising portion of the ARS loop is highly insulated. Inside the tank, the uninsulated ARS loop is heated by virtue of being metallic and being connected to the top of the hot water storage tank. Because of this, and because of the fact that the ARS loop extends above the top of the flat plate collector, it creates a negative pressure head in the rising portion of the ARS loop compared to the higher pressure head in the falling portion of the loop which has a higher pressure head due to water cooling nocturnally in the flat plate. Therefore, when the system attempts to reverse siphon, the cooler water which would ordinarily flow up the descending passage way from the bottom the flat plate to the top of the storage tank, encounters a negative pressure head created by the warmer water in the rising portion of the anti-reverse siphon loop, which stops the reverse motion of the fluid in the system.

SUMMARY OF THE INVENTION

The instant invention incorporates the same basic anti-reverse siphon feature in several embodiments of heating systems which are in general specific adaptations for particular puposes. The basic system can be used in virtually any environment in which solar heating is utilized to either heat water, or for space heating. Whereas the first patent covered primarily systems adapted for utilization in heating water, the second patent covered embodiments which could be incorporated directly into the wall of a building, and which are basically passive, anti-reverse siphon space heaters. These space heaters utilized an internal equivalent of the anti-reverse siphon loop to prevent reverse siphoning.

The applications covered by the instant patent application include a unit having the top of the flat plate in essence between a foot above and a foot below the top of the hot water tank, and actually achieving the anti-reverse siphon effect by positioning the ARS loop six inches above the top of the flat plate.

Other embodiments include the utilization of a cylindrical horizontally extended hot water storage tank, a heat exchanger incorporated within a standard storage tank, an auxiliary heater incorporated in the rising portion of the ARS loop, and a specialized system utilizing a corrugated flat plate with alternate transparent corrugations which are rearwardly concave, to accomodate a serpentine or a manifold arrangement having blackened tubes passing behind the transparent corrugated positions, and in front of the opaque or reflective corrugated portions.

BRIEF DESCRIPTION OF THE DRAWINGS

FIG. 1 is a elevational, somewhat diagrammatic view of a typical ARS loop configuration with an alternative heat exchanger incorporated into the system to permit fluids within the tank and within the heat exchanger system to be of a different pressure and/or incompatible fluids;

FIG. 2 is an illustration of a horizontally extended cylindrical tank with the ARS loop built in;

FIG. 3 illustrates a totally self-contained tandem unit wherein the water heating is accomplished by utilization of a flat plate, and subsequently air is heated by utilizing the hot water storage tank from the first system as a heating element for the second system;

FIG. 4 illustrates an ARS loop with an immersion heater in the rising portion to stop reverse siphoning in the case of prolonged or extreme ambient cold conditions;

FIG. 5 illustrates a corrugated flat plate modification; and,

FIG. 6 illustrates a configuration wherein the flat plate, such as the type illustrated in FIG. 5, could be used as a portion of a greenhouse wall in addition to generating hot water.

DETAILED DESCRIPTION OF THE PREFERRED EMBODIMENTS

FIG. 1 illustrates the basic ARS system wherein a hot water tank 10, of the standard, cylindrical, upright variety is used. Down into this tank extends an ascending passageway 12, which begins at 14 near the bottom of the tank, and near the cold water supply inlet 16. The top of the ascending passageway communicates with the ARS loop 18, which ordinarily would be an integral part of the ascending passageway 12. The rising portion 20 of the ARS loop, and possibly the uppermost portion 22, are covered with insulation 24 so that the metallic pipe constituting the ascending passsageway 12 and the riser 20 of the ARS loop will conduct heat from the hot water tank to the water in the ARS loop, and will resist being cooled by ambient temperatures because of the insulation.

As the ARS loop reverses and continues into its falling portion 26, it becomes the descending passageway 28 which communicates to the lower inlet 30 of the flat plate collector 32. The flat plate collector could be of the type described below and illustrated in FIG. 5, or any other conventional type of flat plate.

Circulation during forward operation passes up through the flat plate and out the outlet 34, at which point the heated water is then returned via return line 36 into the upper portion of the tank 10. This, together with the normal hot water outlet 38 at the top of the tank, completes the circulatory system of the entire apparatus, with the exception of the optional heat exchange coil 40 which, in the example illustrated, connects the bottom of the return line 36 to the opening 14 in the ascending passageway so that a complete, separate line could be established. This clearly would enable antifreeze or some other operating fluid to be used independently of the water or other fluid that is being heated in the tank 10.

Thus, under forward operation, hot water in the flat plate 32 rises, and is injected into the top of the hot water tank. The cold water is drawn from the bottom of the hot water tank through the inlet 14 and introduced into the lower inlet 30 of the flat plate, and circulation thus flow normally, with the heated flat plate acting as the driver of the system. At night time, and whenever the ambient temperature falls below the temperature of the water in the storage tank, radiation from the flat plate will cause it to cool the water it contains, causing a positive, downward pressure head to develop. The pressure head will force cold water up the descending passageay 28 into the ARS loop. If this passageway 28 empties directly into the top of the tank, there would be a continuous flow, gradually siphoning off the hot water from the top of the tank through the return line 36, cooling it, and re-depositing it in the bottom of the tank through the ascending passageway 12.

With the ARS loop, however, a negative pressure head develops in the rising portion 20 of the ARS loop because the water in there is warmed, first by virtue of convection from within the tank, and then that water is maintained warm by conduction through the pipe from the hot water and metal of the tank. This heat is maintained by virtue of the insulation 24. The other side, the falling portion 26, of the ARS loop is not insulated and becomes cool as the reverse flow continues, causing a positive pressure head. The positive pressure head of the descending passageway 28 will in general offset the positive pressure head which attempts the reverse flow inside the flat plate collector itself, and with the addition of the heated riser portion 20 of the ARS loop, effectively stops reverse siphoning.

The geometry of the elements in FIG. 1 are as follows: The top portion of the ARS loop should be at least 6 inches above the top of the flat plate collector. With this minimum dimension generally fixed, then the top of the hot water tank relative to the top of the flat plate collector can vary between +1 foot and −1 foot. When the tank is 1 foot above the top of the flat plate collector, of course the ARS loop would be well above the tank, creating a very strong opposing pressure head to any reverse siphoning. This configuration would not reverse siphon under virtually any circumstances.

On the other hand, when the tank is dropped down into a position in which the top of the tank is a foot below the top of the flat plate collector, under moderately cold conditions, the system might indeed siphon forward as the freezing point is approached. This might be desirable to prevent the system from freezing, and is preferable to having stagnant water within the flat plate collector freezing and bursting the piping in the system.

Another approach in this same problem, i.e. that of freezing, is the incorporation of an immersion heater such as that shown at 42 in FIG. 4 into the rising portion of the ARS loop. Beyond merely ceasing the reverse siphoning, the immersion heater can create a negative pressure head in the rising portion 20 of the ARS loop to actually cause positive flow under conditions of very cold ambient air. Although by definition the incorporation of the externally energized heater eliminates the completely passive nature of the system, it is such an inexpensive, simple, and potentially problem free invasion into passivity that it is a welcome alternative to the possibility of frozen, burst pipes. It is about the minimum of complexity in a electromechanical device that could be installed, that does not require any troublesome valving or plumbing, but merely a power source and a switch.

FIG. 2 is illustrated to make it clear that the tank need not be the same configuration and orientation as the tank 10. In FIG. 2, a horizontally extended tank 44 is used, having basically the same ARS loop 18, with the same internal configurations and spatial orientation criteria as the FIG. 1 embodiment.

Turning now to FIG. 3, this embodiment is a tandem system utilizing a wedge-shaped unit disclosed in the prior issued patent. The previous disclosure, however, related to a water heating application, whereas the instant embodiment is a combination water heater and space heater.

The water heater parts are similar to those identified in FIG. 1 and are lettered with an "a" after the numeral to identify the part as pertaining to the embodiment of FIG. 3. The water tank 10a in this embodiment would either be a flat tank, or as would be the case in a pressurized system, a flat array of several cylindrical tanks. Ascending passageway or passageways 12a within the tank or tanks, which will be assumed singular for the remainder of the description of this embodiment, pass to the riser portion 20a of the anti-reverse siphon loop 18a, pass back through the descending passsageway 28a and through the flat plate collector 32a. Water then returns through return line 36a into the tank, which receives cold water and produces hot water through inlet and outlet 16a and 38a, respectively.

This system operates the same in principle as the system in FIG. 1, without the heat exchanger coil, with the exception of the physical layout. The physical layout in FIG. 3 is such that the hot water tank or tanks 10a serve as the heating element for the secondary, space heater system 46. The space heater has an ascending passageway 48, and a descending passageway 50 which passes on the opposite side of the insulating wall 52. The heating passageway 54 empties through outlet 56. Cold air inlet is shown at 58. This secondary system is virtually identical to that disclosed in FIG. 4 in the last issued patent. It is coupled with the basic structure revealed in FIG. 1 of the instant disclosure, to produce as stated above, a tandem system wherein any heat dissipation from the hot water storage tanks of the water system is recaptured in the space heating portion of the system, and thus recycled.

The flat plates that have been discussed at this point could be any of a variety of different modifications of the flat plate concept wherein typically tubes or other fluid passageways pass into thermal contact with a sheet of radiation absorptive material, which heats and transfers by conduction and then convection, heat into the operating fluid.

A specific embodiment of one type of flat plate collector and collector element that could be used is shown in FIG. 5. In this embodiment, the flat plate collector element itself is indicated at 60 as a corrugated sheet. In front of this sheet is a glazing layer 62. The corrugated sheet alternates in that certain corrugations which are rearwardly convex, indicated at 64, are transparent, permitting radiation to pass through to absorptive tubes 66 behind the corrugated collector element. The alternate corrugation 68 are either silvered on the forward side to reflect light to the forward tubes 70, which would be darkened or blackened, or these forwardly concave corrugations could be blackened so that they absorb and reradiate the heat into the tube 70.

The tubes themselves could either be part of a manifold system, or part of a continuous sinusoid, or, as indicated in FIG. 5, they are diagrammatically indicated as being separate with each pair of tubes communicating with one of the storage tanks 72.

One embodiment which could utilize the flat plate is shown in FIG. 6. In this embodiment, the flat plate is shown generally at 74 as being inclined, to define a general area 76 between the flat plate itself and the tanks 72, which would generally be protected from the elements to a certain extent, with the flat plate acting as the side wall of the greenhouse. Some radiation would pass through the flat plate, and the flat plate itself would undoubtedly get somewhat warm, as would the hot water storage tanks, producing a warm, sunny inside for the growing of plants. Obviously, a greenhouse roof and sides could be incorporated into the embodiment of FIG. 6.

Coupled with the prior two issued patents, the instant application should result in a patent covering the above-mentioned several modifications and embodiments of the basic anti-reverse siphon system which can expand the penetration of the concept into different areas in the space and water heating fields. In all of the embodiments, with the minor exception of the heater in the anti-reverse siphon loop, functioning of the system is virtually completely passive, even under the adverse conditions of long, cold evenings. It is basically the principal of eliminating any kind of mechanical and other complex mechanisms, that makes these embodiment special in their adaptations to the specific heating applications which have been disclosed in this specification.

I claim:

1. An anti-reverse siphon solar heating system comprising: (a) a fluid chamber having an inlet and an outlet; (b) a continuous flow passageway comprising in normal downstream order:
    (i) an ascending passageway being open and originating in the lower portion of said chamber and passing up through the top of the chamber;
    (ii) an anti-reverse siphon loop with a rising portion being insulated and being connected to the top of said ascending passageway and extending upward therefrom, an uppermost transverse portion, and a falling portion descending downwardly to define a downstream loop end;
    (iii) an ascending heating chamber with a heating element in thermal contact therewith;
    (iv) a descending passageway connected to downstream loop end and extending downward therefrom into connection with the bottom of said ascending heating chamber and being insulated from said heating chamber;
    (v) a return passageway connecting between the top of said heating chamber and the top of said fluid chamber; and,
(b) the uppermost portion of said loop being higher than the uppermost portion of said ascending heating chamber, and the uppermost portion of said fluid chamber being at least as high as 1 foot beneath the uppermost portion of said ascending heating chamber.

2. Structure according to claim 1 and including an auxiliary heater incorporated into said rising portion of said anti-reverse siphon loop and a means for selectively activating same to counter reverse siphoning or encourage forward cycling in said system.

3. Structure according to claim 1 wherein said fluid chamber is a horizontally extended hot water tank and said heating element is a solar collector plate.

4. Structure according to claim 1 and including a heat exchanger continuously communicating between the open lower end of said ascending portion and the downstream end of said return passageway such that similar or different fluids could be used in said continuous flow passageway and said fluid chamber, respectively, at the same or different fluid pressures.

5. Structure according to claim 1 wherein said heating element comprises a flat plate solar collector internally defining said heating chamber, said solar collector comprises a corrugated sheet with at least alternative corrugation being transparent, and said heating chamber comprises a plurality of parallel communicating pipes some of which pass to the front of said corrugations and the others of which pass behind said transparent corrugations to absorb light passed therethrough.

6. Structure according to claim 5 wherein said flat plate solar collector defines one side of a greenhouse.

7. Structure according to claim 1 wherein said system is a primary system comprising a self-contained solar water heating system with a flat plate collector comprising said heating element, with said fluid chamber being a hot water storage tank, and further including a substantially functionally duplicated secondary system for air space heating utilizing said hot water tank as the heating element for said secondary system.

8. Structure according to claim 7 wherein said primary and secondary systems are defined in a self-contained, wedge-shaped housing for a placement on a surface having a substantial horizontal component, such that said housing is orientable because of said wedge shape such that the upper surface defines a substantial vertical component.

9. Structure according to claim 1 wherein the uppermost portion of said fluid chamber is between the limits of 1 foot higher and 1 foot lower than the uppermost portion of said heating chamber.

10. Structure according to claim 9 wherein said fluid chamber and heating element are vertically adjustable relative to one another within said limits.

* * * * *